United States Patent
Yamamoto et al.

(10) Patent No.: US 8,039,136 B2
(45) Date of Patent: Oct. 18, 2011

(54) BATTERY COOLING DEVICE, BATTERY COOLING AIR FLOW CONTROL DEVICE, AND COMPUTER READABLE MEDIUM

(75) Inventors: Takao Yamamoto, Hirakata (JP); Norito Yamabe, Toyohashi (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 1163 days.

(21) Appl. No.: 11/811,708

(22) Filed: Jun. 11, 2007

(65) Prior Publication Data

US 2007/0298315 A1    Dec. 27, 2007

(30) Foreign Application Priority Data

Jun. 22, 2006  (JP) ................. 2006-172664

(51) Int. Cl.
*H01M 2/00* (2006.01)
*H01M 10/50* (2006.01)

(52) U.S. Cl. .......................... 429/62; 429/61

(58) Field of Classification Search ............. 429/61, 429/62
See application file for complete search history.

(56) References Cited

FOREIGN PATENT DOCUMENTS

| JP | 9092347 A | 4/1997 |
|----|-----------|--------|
| JP | 10064598 A | 3/1998 |
| JP | 2005063689 A | 3/2005 |

*Primary Examiner* — Helen O Conley
(74) *Attorney, Agent, or Firm* — Christensen O'Connor Johnson Kindness PLLC

(57) ABSTRACT

In a battery cooling device for cooling a battery with cooling air from a cooling unit, such as a cooling fan, the cooling fan is not to be driven more than necessary. A cooling air flow control unit calculates a battery temperature change rate indicating an amount of change in battery temperature over a predetermined time based on the battery temperature, and if the calculated battery temperature change rate satisfies a predetermined suppression control condition, the cooling air flow of the cooling fan is suppressed regardless of whether or not the battery temperature is at or below a reference temperature.

9 Claims, 6 Drawing Sheets

BATTERY COOLING DEVICE, BATTERY COOLING AIR FLOW CONTROL DEVICE, AND COMPUTER READABLE MEDIUM

PRIORITY INFORMATION

This application claims priority to Japanese Patent Application No. 2006-172664 filed on Jun. 22, 2006, which is incorporated herein by reference in its entirety.

BACKGROUND OF THE INVENTION

1. Field of the Invention

The present invention relates to a technique for cooling a battery by blowing air, such as from a cooling fan.

2. Description of the Related Art

Batteries are known to generate Joule heat when being charged or discharged. To prevent an excessive rise in battery temperature due to Joule heat, known battery cooling devices cool batteries by blowing cooling air from a cooling fan.

Japanese Patent Laid-Open Publication No. Hei 9-92347 discloses a battery cooling device for controlling the drive of a cooling fan on the basis of an estimated internal temperature by estimating the internal temperature of a battery on the basis of the surface temperature of the battery and the calorific value of the battery. The battery cooling device in Japanese Patent Laid-Open Publication No. Hei 9-92347 continues to drive the cooling fan until the internal temperature of the battery drops to a predetermined temperature.

Furthermore, Japanese Patent Laid-Open Publication No. Hei 10-64598 discloses a battery cooling device for controlling a cooling fan on the basis of the battery temperature and the battery temperature time change rate. As shown in the cooling fan control maps in FIGS. 4, 8 and 13 in Japanese Patent Laid-Open Publication No. Hei 10-64598, the battery control device in Japanese Patent Laid-Open Publication No. Hei 10-64598 continues to drive the cooling fan if the battery temperature is high even with a low battery temperature time change rate. That is, the battery cooling device in Japanese Patent Laid-Open Publication No. Hei 10-64598 also continues to drive the cooling fan unless the battery temperature drops to a predetermined temperature.

In addition, Japanese Patent Laid-Open Publication No. 2005-63689 discloses a battery cooling control device for controlling a cooling fan on the basis of the battery temperature and the cooling air temperature. The battery cooling control device in Japanese Patent Laid-Open Publication No. 2005-63689 prevents the battery from being cooled more than necessary by reducing the air flow of the cooling fan in the case when the difference between the battery temperature and the cooling air temperature is large and the cooling air temperature is low. However, the battery cooling control device in Japanese Patent Laid-Open Publication No. 2005-63689 also continues to drive the cooling fan unless the battery temperature drops to a predetermined temperature.

Thus, the devices disclosed in the patent documents continue to drive the cooling fan unless the battery temperature drops to a predetermined temperature.

SUMMARY OF THE INVENTION

However, if the change in battery temperature is small even though the cooling fan is continually driven for the purpose of lowering the battery temperature to a predetermined temperature, the cooling effect on the battery from driving the cooling fan is not very high.

It is therefore an object of the present invention to avoid driving a cooling unit, such as a cooling fan, more than necessary in a battery cooling device for cooling a battery with air from the cooling unit.

The battery cooling device relating to the present invention comprising a cooling unit for supplying air to a battery to cool said battery, a temperature change rate calculation unit for calculating a battery temperature change rate indicating an amount of change in battery temperature of the battery over a predetermined time and an air flow control unit for controlling the air flow of the cooling unit so that the battery temperature is at or below a predetermined reference temperature, and when the battery temperature change rate satisfies a predetermined suppression control condition, for suppressing the air flow of the cooling unit regardless of whether or not the battery temperature is at or below the reference temperature.

According to one aspect of the battery cooling device relating to the present invention, after the suppression is started, the air flow control unit terminates the suppression when the battery temperature detected by the battery temperature measurement unit exceeds the reference temperature by a predetermined upper limit threshold temperature.

According to one aspect of the battery cooling device relating to the present invention, the air flow control unit terminates the suppression at the elapse of a predetermined suppression period after the suppression is started.

According to one aspect of the battery cooling device relating to the present invention, the air flow control unit adjusts by increasing the air flow of the cooling unit as the battery temperature increases and calculates the battery temperature change rate corresponding to the increasing of the air flow.

According to one aspect of the battery cooling device relating to the present invention, the air flow control unit sets a suppression period indicating an execution period of the suppression so as to be shorter for higher air flow and terminates the suppression when the suppression period from the start of the suppression elapses.

According to one aspect of the battery cooling device relating to the present invention, the air flow control unit judges the suppression control condition has been satisfied when the battery temperature change rate falls within a predetermined numeric value range.

According to one aspect of the battery cooling device relating to the present invention, if the battery temperature change rate is $\Delta Tb$, the numeric value range is defined by $\alpha < \Delta Tb < \beta$ where $\alpha < 0$ and $\beta > 0$ and satisfies $|\alpha| > |\beta|$.

According to the present invention, driving the cooling unit more than necessary can be prevented in the battery cooling device for cooling the battery with air from the cooling unit, such as a cooling fan.

DETAILED DESCRIPTION OF THE PREFERRED EMBODIMENTS

The best mode (referred to hereinafter as the embodiment) for carrying out the present invention will be described hereinafter with reference to the attached drawings.

Figure 1:
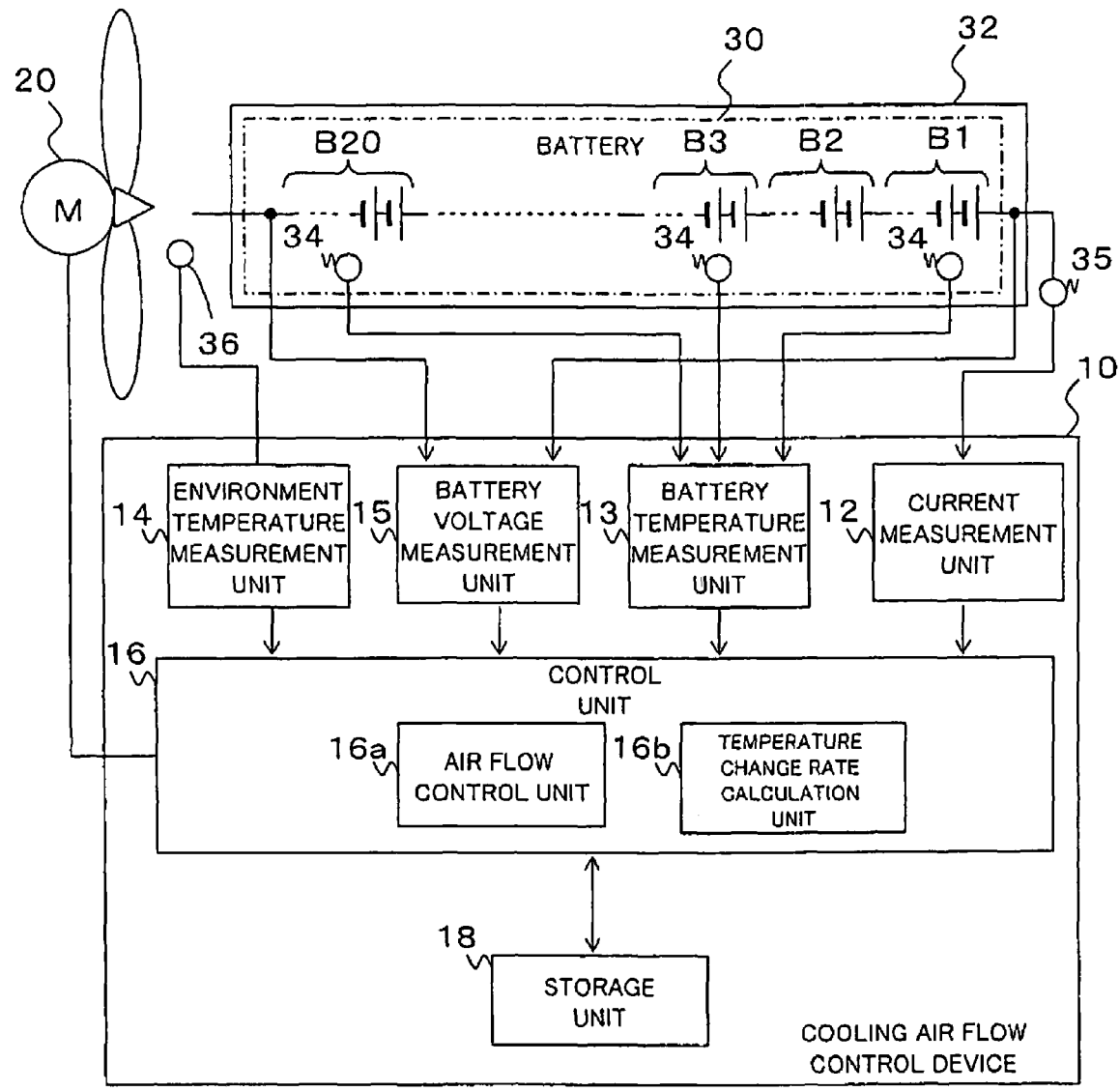
FIG. 1 illustrates the configuration of a battery cooling device in the embodiment.

FIG. 1 illustrates the configuration of a battery cooling device in the embodiment. The battery cooling device includes a cooling fan 20 for supplying cooling air to a battery 30 as a cooling unit for the purpose of cooling the battery 30 and a cooling air flow control device 10 for adjusting the cooling air flow of the cooling fan 20. The cooling air flow control device 10, for example, forms a part within a battery electronic control unit (battery ECU). The battery cooling device and the battery 30, for example, are installed in an electric vehicle running by the driving force of an electric motor or in a hybrid electric vehicle using the driving force of both an engine and an electric motor.

The battery 30 is configured by connecting battery blocks B1 to B20 in series as shown in FIG. 1. The battery blocks B1 to B20 are contained in a battery case 32. The battery blocks B1 to B20 are each configured by electrically connecting two battery modules in series, and each battery module is further configured by electrically connecting six cells in series. A nickel-metal hydride battery or a lithium ion battery can be used for the cells. It should be noted that the numbers of battery blocks, battery modules, and cells are not particularly limited. The configuration of the battery 30 is also not limited to the aforementioned example.

Furthermore, multiple temperature sensors 34 are located within the battery case 32. The multiple temperature sensors 34 are located so that one temperature sensor 34 is located for every group, where a group includes multiple battery blocks having relatively close temperatures or one battery block having a relative temperature difference with another battery block. Furthermore, the division into groups is performed by measuring the temperature of each battery block, such as in a prior experiment. The embodiment includes M (where M is an integer) temperature sensors 34 and the temperature detected by each temperature sensor 34 is respectively expressed as temperature Tb(1) to temperature Tb(M).

The cooling air flow control device 10 includes a current measurement unit 12, a battery temperature measurement unit 13, an environment temperature measurement unit 14, a control unit 16, and a storage unit 18.

The current measurement unit 12 measures a charge/discharge current I during charging or discharging of the battery 30. The current measurement unit 12 in the embodiment converts an analog signal, which is output by a current sensor 35, into a digital signal, on the basis of which current data is generated and output to the control unit 16 to specify a current that is input by the battery 30 during charging and a current that is output from the battery 30 during discharging. Furthermore, the current measurement unit 12 generates current data, for example, with charging as negative and discharging as positive. The output of current data from the current measurement unit 12 to the control unit 16 is performed at a preset period (such as 100 ms) and the control unit 16 stores the current data into the storage unit 18.

The battery temperature measurement unit 13 measures the battery temperature of the battery 30. The embodiment converts an analog signal, which is output by each temperature sensor 34 located at every group, into a digital signal. On the basis of this, battery temperature data by group is generated to specify the battery temperature by group and this is output to the control unit 16. The control unit 16 obtains the maximum value of the temperature Tb(1) to temperature Tb(M) shown in the input temperature data by group, generates battery temperature data to specify the obtained battery temperature Tb, and stores the data into the storage unit 18. The output of temperature data by group from the battery temperature measurement unit 13 to the control unit 16 is performed at a preset period (such as 100 ms) and the storage of the battery temperature data into the storage unit 18 by the control unit 16 is also performed at a preset period.

The environment temperature measurement unit 14 converts an analog signal that is output by a temperature sensor 36, which detects an environment temperature Ta surrounding the battery 30, into a digital signal, on the basis of which environment temperature data is generated and output to the control unit 16 to specify the battery environment temperature Ta. The output of environment temperature data from the environment temperature measurement unit 14 to the control unit 16 is also performed at a preset period (such as 100 ms) and the control unit 16 stores the environment temperature data into the storage unit 18. The temperature sensor 36 is installed near the inlet (not shown) for the purpose of supplying cooling air from the cooling fan 20 to the battery 30.

The battery voltage measurement unit 15 measures the block terminal voltages Vb (1) to Vb (20) of the battery blocks B1 to B20. The battery voltage measurement unit 15 generates voltage data to specify the block terminal voltages Vb (1) to Vb (20) and outputs the data to the control unit 16. The control unit 16 totals the block terminal voltages to obtain the terminal voltage of the battery 30. The output of voltage data from the battery voltage measurement unit 15 to the control unit 16 is performed at a preset period (such as 100 ms) and the control unit 16 stores the voltage data into the storage unit 18.

Figure 2:
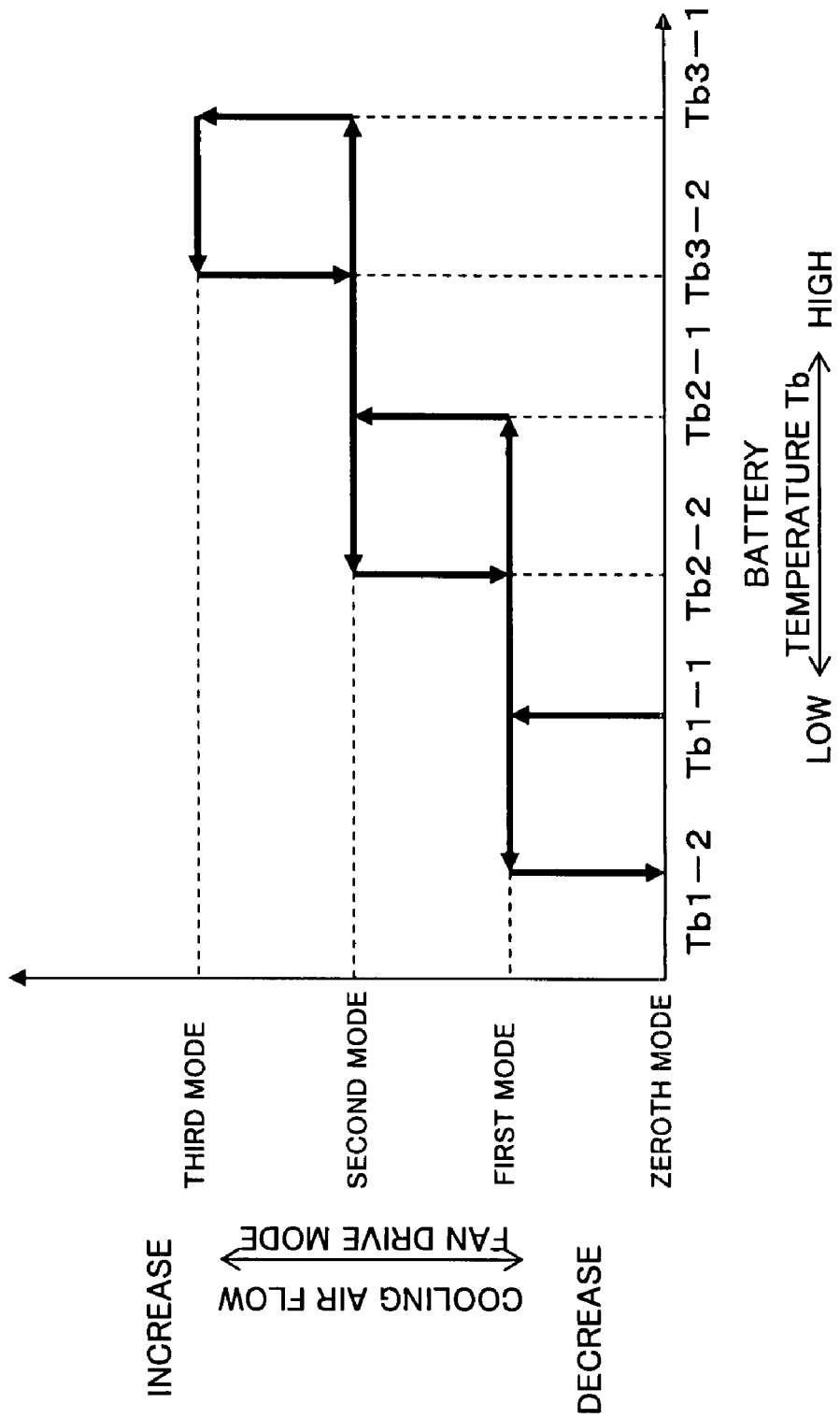
FIG. 2 shows an example of a mode decision map showing the relationship between a fan drive mode that determines the cooling air flow and the battery temperature.

The control unit 16 includes an air flow control unit 16a. The air flow control unit 16a reads the battery temperature data at the preset period from the storage unit 18 and acquires the battery temperature Tb shown in the battery temperature data. Next, the air flow control unit 16a adjusts the cooling air flow of the cooling fan 20 on the basis of the battery temperature Tb. The air flow control unit 16a, for example, determines the fan drive mode with respect to the battery temperature Tb by referencing a mode decision map, such as that shown in FIG. 2, which shows the relationship between the fan drive mode specifying the cooling air flow and the battery temperature Tb, and drives the cooling fan 20 so that a preset cooling air flow is obtained with respect to the determined fan drive mode. More specifically, when the battery temperature exceeds Tb1-1, the air flow control unit 16a changes the fan drive mode setting from the zeroth mode to the first mode to drive the cooling fan 20 so that a cooling air flow corresponding to the first mode is obtained. The zeroth mode refers to a mode where the cooling air flow is zero, namely, the cooling fan 20 is not driven. Thereafter, when the battery temperature drops below Tb1-2, the control unit 16 sets the zeroth mode and terminates driving the cooling fan 20. Similarly, when the battery temperature exceeds Tb2-1 or Tb3-1, the control unit 16 switches the fan drive mode to the second mode or the third mode, and when the battery temperature drops below Tb2-2 or Tb3-2, the control unit 16 switches the fan drive mode from the second mode to the first mode or from the third mode to the second mode. The mode decision map is stored in advance into the storage unit 18.

In the aforementioned battery cooling device, the cooling air flow control device 10 normally maintains the current fan drive mode until the battery temperature Tb drops below the reference temperature (Tb1-2, Tb2-2, Tb3-2). Namely, the cooling air flow of the cooling fan 20 is not decreased as long as the battery temperature Tb does not drop below the reference temperature. However, there are instances where the battery temperature Tb does not drop even if the cooling fan 20 is continually driven and where the cooling effect from driving the cooling fan 20 is insufficient. In such instances where the cooling fan 20 is continually driven, there is the risk of noise generation and wasted power consumption from driving the cooling fan 20.

Accordingly, the control unit 16 in the embodiment includes a temperature change rate calculation unit 16b. The temperature change rate calculation unit 16b calculates a battery temperature change rate $\Delta Tb$ indicating the amount of battery temperature change during a predetermined time on the basis of the periodically acquired battery temperature Tb. When the battery temperature change rate $\Delta Tb$ that was calculated by the temperature change rate calculation unit 16b satisfies the predetermined suppression control condition, the air flow control unit 16a suppresses the cooling air flow of the cooling fan 20 even if the battery temperature Tb does not fall blow the reference temperature. Namely, the air flow control unit 16a switches the fan drive mode from the current mode to a mode where the cooling air flow decreases. Hereinafter, the switching from the current mode to a mode in which the cooling air flow decreases will be referred to as switching to a lower mode and the switching from the current mode to the mode in which the cooling air flow increases will be referred to as switching to a higher mode.

Next, the procedure for suppression control of the cooling air flow performed by the control unit 16 will be described with reference to the flowchart shown in FIG. 3.

Figure 3:
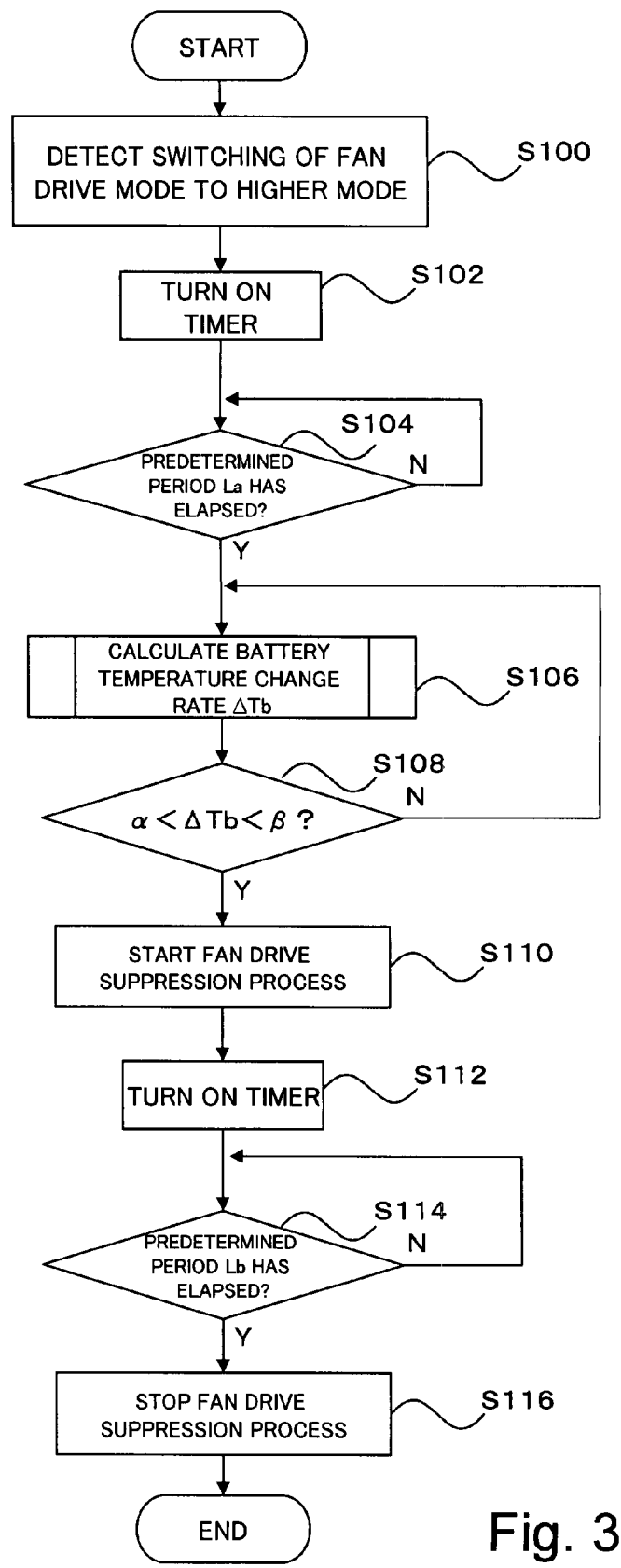
FIG. 3 is a flowchart showing a procedure of a suppression process for cooling air flow performed by the control unit.

In FIG. 3, when the switching of the fan drive mode to a higher mode is detected (S100), the control unit 16 turns on the timer (S102). Thereafter, when a predetermined period La (such as 60 sec) has elapsed (the judgment result of the step S104 is affirmative "Y"), the control unit 16 calculates (S106) in the temperature change rate calculation unit 16b the battery temperature change rate $\Delta Tb$ indicating the rate of change in the battery temperature during the predetermined period La.

The calculation method of the battery temperature change rate $\Delta Tb$ will be described here with reference to the flowchart shown in FIG. 4. First, the temperature change rate calculation unit 16b references the battery temperature data stored in the storage unit 18, acquires (S200) the most recent battery temperature Tbnow, and further acquires (S202) the battery temperature Tbpre that was measured the predetermined period La prior to when the battery temperature Tbnow was measured. Next, the temperature change rate calculation unit 16b calculates (S204) the battery temperature change rate $\Delta Tb$ based on formula (1).

$$\Delta Tb=(Tbnow-Tbpre)/La \quad (1)$$

Returning to FIG. 3, after the battery temperature change rate $\Delta Tb$ has been calculated as described above, the control unit 16 judges whether the battery temperature change rate $\Delta Tb$ satisfies a predetermined suppression control condition, such as whether the battery temperature change rate $\Delta Tb$ satisfies a predetermined numeric range ($\alpha<\Delta Tb<\beta$), and if the battery temperature change rate $\Delta Tb$ does not satisfy the predetermined suppression control condition (the judgment result of step S108 is negative "N"), the control unit 16 judges the cooling air flow by the current fan drive mode is sufficiently effective to cool the battery 30 and again calculates the battery temperature change rate $\Delta Tb$. Here, the predetermined numeric range is specified by $\alpha$, signifying a lower limit threshold when the battery temperature Tb is decreasing, such as "−0.5", and $\beta$, signifying an upper limit threshold when the battery temperature Tb is increasing, such as "0.1". Although the absolute value of threshold $\alpha$ and the absolute value of threshold $\beta$ may be set to be equal, setting the absolute value of threshold $\beta$ to be less than the absolute value of threshold $\alpha$ reduces the probability of executing the fan drive suppression control (to be described hereinafter) when the battery temperature increases so that the rise in battery temperature can be suppressed.

As an instance where the battery temperature change rate $\Delta Tb$ does not satisfy the predetermined suppression control condition, an example may be considered where the battery temperature Tbnow is higher to some extent compared to the battery temperature Tbpre and the battery temperature Tbnow exceeds an upper limit threshold temperature (such as Tb1-1, Tb2-1, Tb3-1), which is a condition of switching the current fan drive mode to a higher mode. In this instance, the control unit 16 performs switching of the fan drive mode to a higher mode in a process independent of the procedure shown in FIG. 3. If switching of the fan drive mode to a higher mode is detected during the process shown in FIG. 3, the process is interrupted and restarted from step S100. Furthermore, when switching to a higher mode is detected also in the case where the fan drive suppression control process to be described hereinafter is executing, the control unit 16 interrupts the fan drive suppression control process and again starts the process from step S100.

On the other hand, if the battery temperature change rate $\Delta Tb$ satisfies the predetermined suppression control condition (the judgment result of the step S108 is affirmative "Y"), the control unit 16 starts the fan drive suppression process (S110). The purpose of the fan drive suppression process performed by the control unit 16 is to reduce noise generation and power consumption due to excessively driving of the cooling fan 20, for example, by switching the fan drive mode to a lower mode or switching to the zeroth mode, namely, to suppress the cooling air flow by the cooling fan 20, which includes terminating the drive of the cooling fan 20.

After the fan drive suppression process is started and a predetermined suppression period Lb (such as 60 seconds) has elapsed (the judgment result of the step S114 is affirmative "Y") from resetting and turning on the timer again (S112), the control unit 16 terminates (S116) the fan drive suppression process. Namely, the control unit 16 switches the fan drive mode to the mode before starting the fan drive suppression process.

As described above, even if the cooling fan 20 is continually driven when the battery temperature change rate $\Delta Tb$ satisfies the predetermined suppression control condition, the control unit 16 in the embodiment judges that the cooling effect resulting from driving the cooling fan 20 is insufficient and reduces the cooling air flow of the cooling fan 20 or terminates the cooling fan 20 regardless of the value of the battery temperature Tb. As a result, it becomes possible to prevent driving the cooling fan 20 more than necessary and to reduce noise generation and power consumption due to excessive driving of the cooling fan 20.

Furthermore, the control unit 16 in the embodiment terminates the fan drive suppression process after the elapse of a predetermined suppression period. When the fan drive suppression process is performed, the cooling air flow is suppressed so that normally the battery temperature Tb begins to rise. If switching to a higher mode is performed during fan drive suppression processing due to the rise in battery temperature Tb, the fan drive suppression process is interrupted as described above. However, if the difference between the battery temperature Tb at the start of the fan drive suppression process and the upper limit threshold temperature for switching to a higher mode is substantially large, the execution time of the fan drive suppression process lengthens and results in the risk of repeated transitions at high battery temperatures.

Accordingly, terminating the fan drive suppression process in the embodiment after the elapse of a predetermined suppression period provides a limit on the execution period of the fan drive suppression process and prevents the repeated transitions at high battery temperatures. The higher the battery temperature, the more preferable it is to avoid the repeated transitions at high temperatures. Although the aforementioned predetermined suppression period Lb was described as a fixed value, the duration of the predetermined suppression period Lb may be modified in accordance with the mode immediately prior to starting the fan drive suppression process. Namely, the control unit 16 may set the predetermined suppression period Lb to a short value as the fan drive mode is set with a high cooling air flow. For example, the predetermined suppression period Lb2 in the second mode is set shorter than the predetermined suppression period Lb1 when the fan drive mode immediately prior to starting the fan drive suppression process is in the first mode. As a result, it is possible to reduce the probability of repeated transitions at high temperatures of the battery 30.

Figure 5:
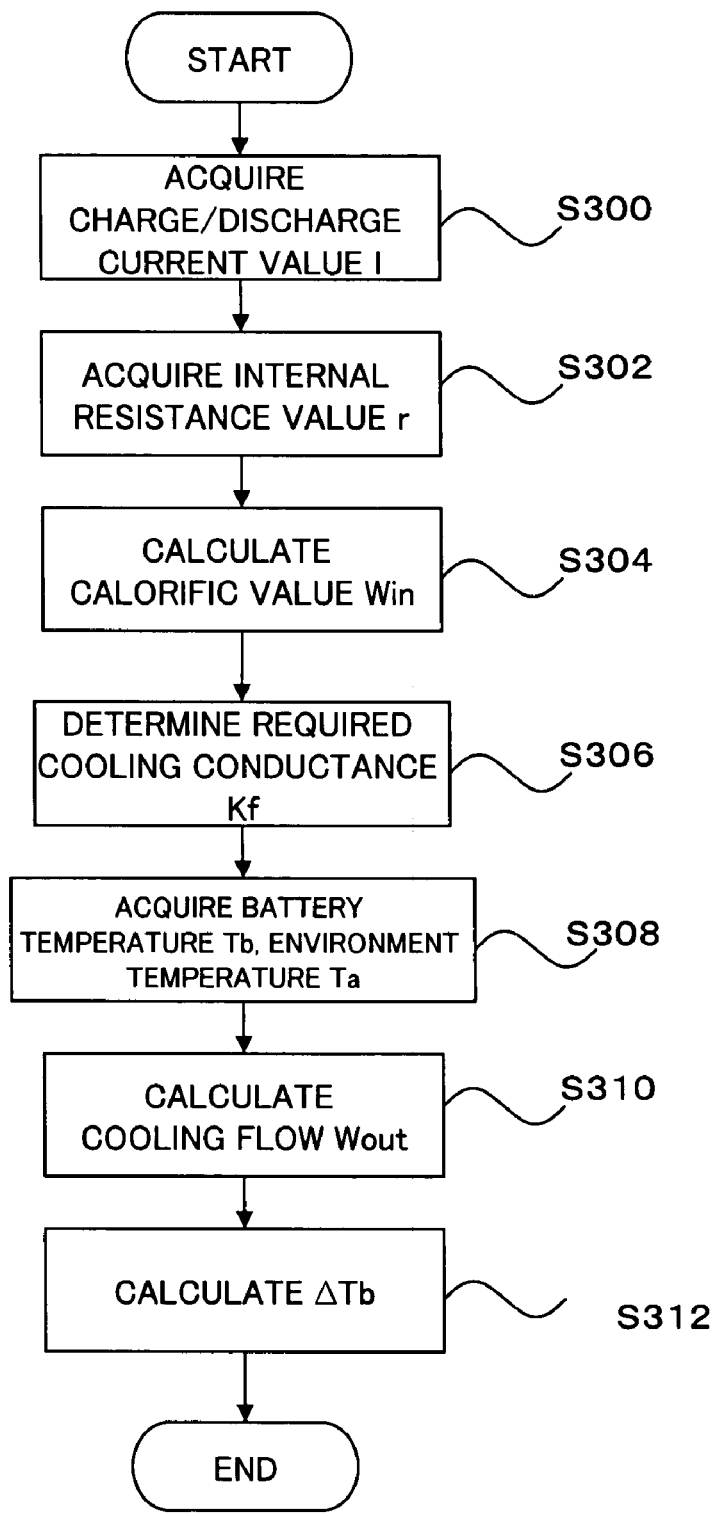
FIG. 5 is a flowchart showing an example of a procedure when the control unit calculates the battery temperature change rate.

FIG. 5 is a flowchart showing another procedure when the control unit 16 calculates the battery temperature change rate $\Delta Tb$.

In FIG. 5, the control unit 16 first references current data stored in the storage unit 18 and acquires (S300) the charge/discharge current I and further acquires (S302) the battery internal resistance r stored in the storage unit 18. By storing into the storage unit 18 in advance a reference table showing the relationship between the battery temperature Tb and the internal resistance r, for example, the internal resistance r may be obtained in accordance with the battery temperature Tb on the basis of the reference table. Furthermore, by acquiring and storing multiple pairs of data of the battery voltage V and the charge/discharge current I over a predetermined period and obtaining a primary approximate line (approximate line of voltage V and current I) from regression analysis, the internal resistance r may be obtained from the slope of the V-I approximate line.

Next, the control unit 16 calculates (S304) the calorific value Win of the battery based on formula (2).

$$Win = I^2 \times r \qquad (2)$$

Furthermore, the control unit 16 obtains (S306) a required cooling conductance Kf indicating the degree of cooling ease for the battery 30. The required cooling conductance Kf has an approximately proportional relationship with the cooling air flow and a larger value of Kf signifies the battery 30 is easier to cool. In the embodiment, for example, a table defining Kf for every fan drive mode is stored in advance in the storage unit 18 and the control unit 16 references the table to obtain the Kf corresponding to the current fan drive mode.

Furthermore, the control unit 16 references a battery temperature table and an environment temperature table stored in the storage unit 18, acquires (S308) the battery temperature Tb and environment temperature Ta, and calculates (S310) the cooling flow Wout on the basis of the following formula (3).

$$Wout = Kf(Tb - Ta) \qquad (3)$$

Furthermore, the control unit 16 calculates (S312) the battery temperature change rate $\Delta Tb$ based on formula (4).

$$\Delta Tb = (Win - Wout)/Cb \qquad (4)$$

Here, Cb represents the heat capacity (J/K) of the battery 30 and the heat capacity Cb is stored in advance in the storage unit 18.

The control unit 16 may calculate the battery temperature change rate $\Delta Tb$ from the aforementioned process.

Figure 6:
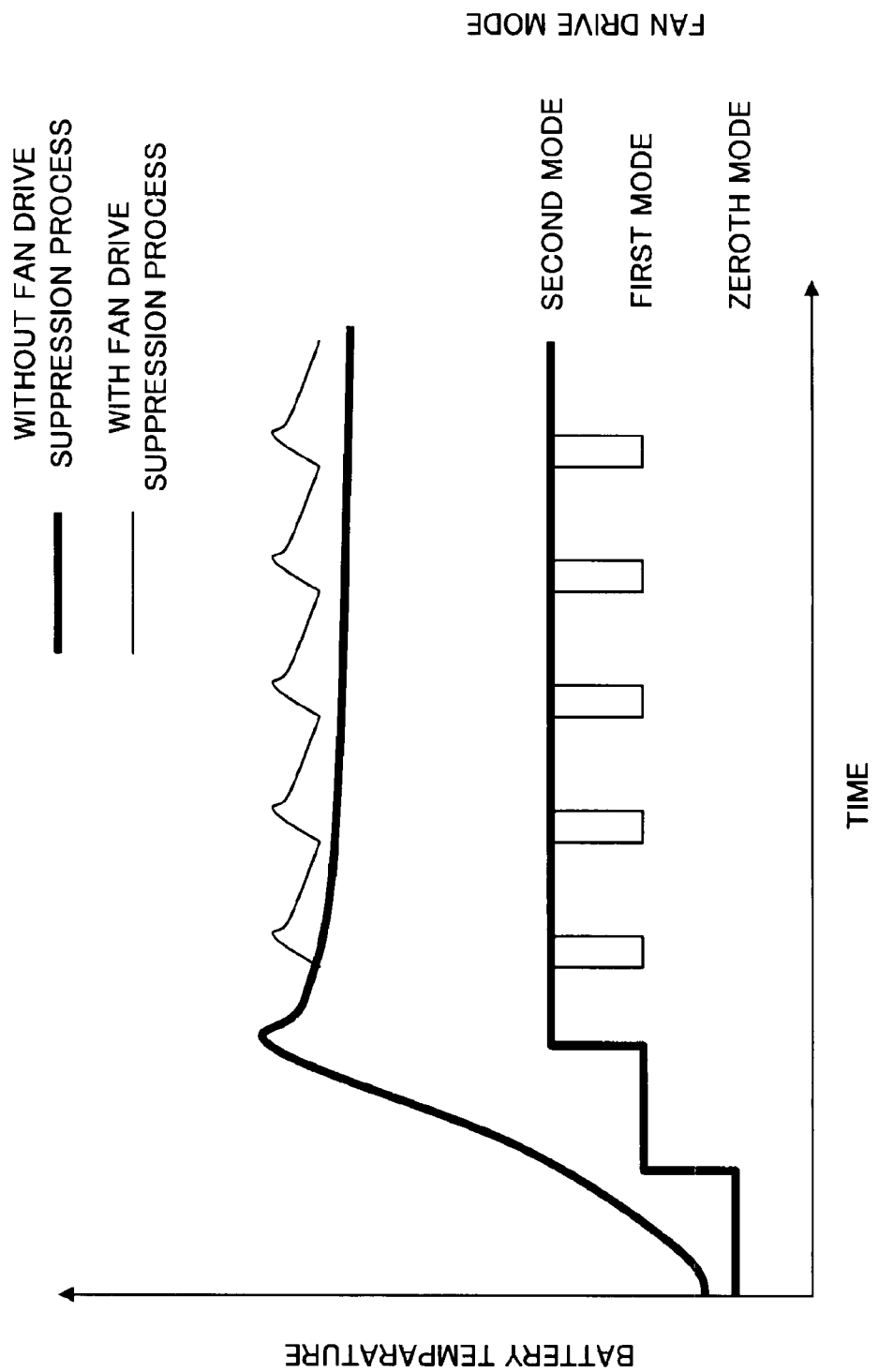
FIG. 6 shows the changes in battery temperature and cooling fan drive mode when the fan drive suppression process is and is not performed.

FIG. 6 is a graph showing the change in the battery temperature Tb and the cooling fan drive mode when the fan drive suppression process is and is not performed. In FIG. 6, when not performing the fan drive suppression process, switching of the cooling fan drive mode is not performed even if the battery temperature shows almost no change after switching to the second mode. On the other hand, when performing the fan drive suppression process and when the change in battery temperature after switching to the second mode is small, the mode is switched to the first mode, which is a lower mode, to suppress excessive driving of the cooling fan 20. By performing the fan drive suppression process in this manner, it is possible to prevent driving the cooling fan 20 more than necessary while maintaining the same battery temperature Tb as when the fan drive suppression process is not performed. Thus, noise generation and power consumption due to excessive driving of the cooling fan 20 can be reduced.

Figure 4:
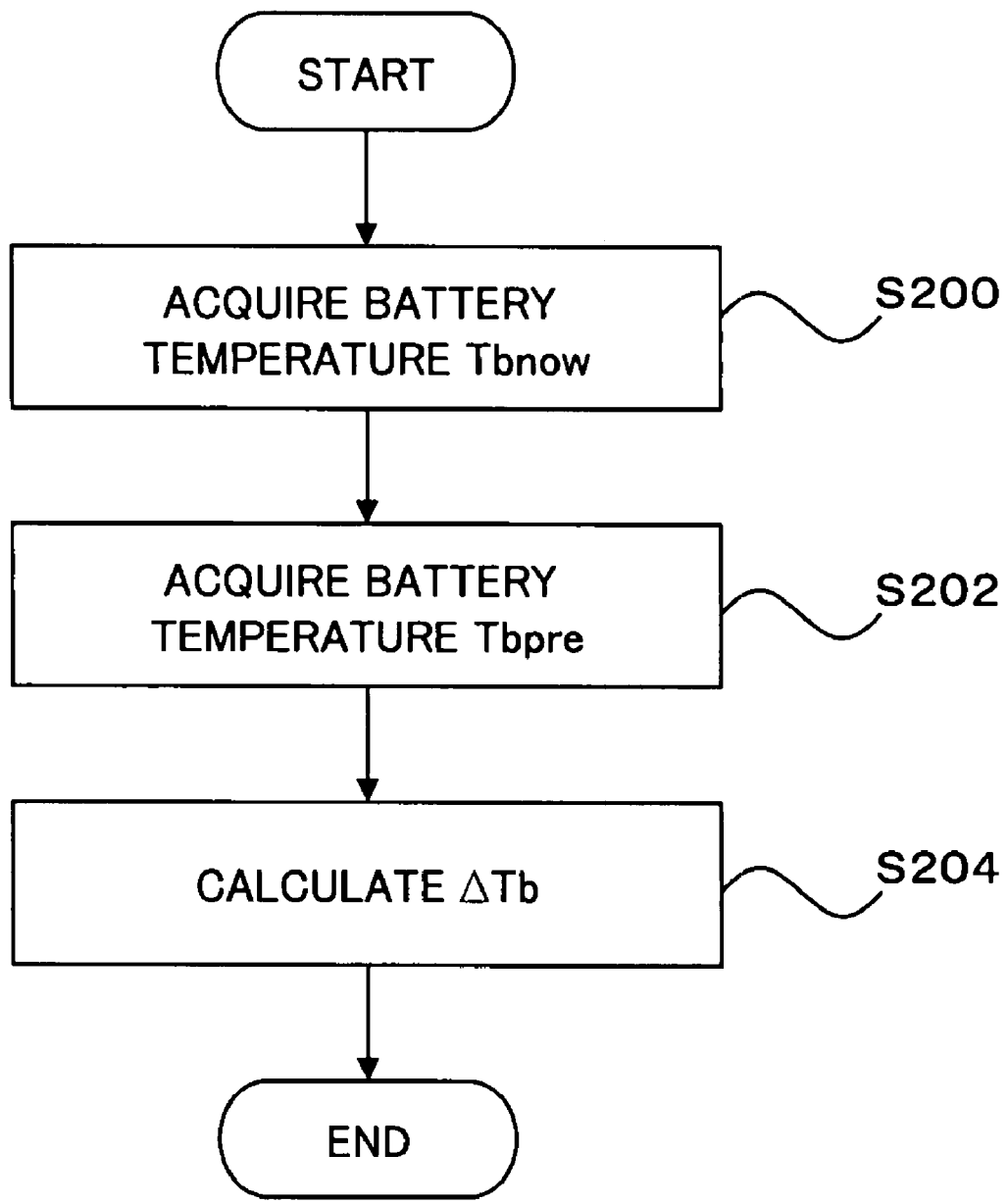
FIG. 4 is a flowchart showing an example of a procedure when the control unit calculates the battery temperature change rate.

The cooling air flow control unit can be realized by installing and executing a program on a microcomputer for implementing the processes shown in FIG. 3 to FIG. 5.

Namely, the microcomputer has a CPU, various types of memory, such as ROM, RAM, and EEPROM, and a communication bus and interface, and the CPU sequentially reads and executes an executable program that is stored in advance into ROM as firmware. The mode decision map and the suppression control condition are stored in advance, and the CPU determines the fan drive mode on the basis of the battery temperature Tb that is input from the temperature sensor via the interface and stored into memory, and outputs a driving signal to the cooling fan to generate a cooling air flow corresponding to the determined fan drive mode. Furthermore, the CPU periodically calculates the battery temperature change rate $\Delta Tb$, and when the battery temperature change rate $\Delta Tb$ satisfies the predetermined suppression control condition, the fan drive mode is switched to a lower mode regardless of the value indicated by the battery temperature Tb.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A battery cooling device comprising:
   a cooling unit for supplying air flow to a battery to cool said battery;
   a temperature change rate calculation unit configured to calculate a battery temperature change rate indicating an amount of change in a battery temperature of said battery over a predetermined time; and
   an air flow control unit configured to control said air flow of said cooling unit when said battery temperature is above a predetermined reference temperature, and said air flow control unit is further configured to perform a fan drive suppression process of said air flow of said cooling unit when said battery temperature change rate satisfies a predetermined suppression control condition regardless of whether or not said battery temperature is at or below said reference temperature and said air flow control unit is configured to stop said fan drive suppression process and switch to a previous mode when a predetermined suppression period $L_b$ has elapsed after said fan drive suppression process is started.

2. A battery cooling device according to claim 1, wherein: after said suppression is started, said air flow control unit is configured to terminate said suppression when said battery temperature exceeds said reference temperature by a predetermined upper limit threshold temperature.

3. A battery cooling device according to claim 1, wherein: said air flow control unit is configured to terminate said suppression at elapse of a predetermined suppression period after said suppression is started.

4. A battery cooling device according to claim 1, wherein: said air flow control unit is configured to increase said air flow of said cooling unit as said battery temperature increases and to calculate said battery temperature change rate corresponding to said increase of said air flow.

5. A battery cooling device according to claim 4, wherein: said air flow control unit is configured to set a suppression period indicating an execution period of said suppression so as to be shorter for higher said air flow and terminates said suppression when said suppression period from start of said suppression elapses.

6. A battery cooling device according to claim 1, wherein: said air flow control unit is configured to judge said suppression control condition has been satisfied when said battery temperature change rate falls within a predetermined numeric value range.

7. A battery cooling device according to claim 6, wherein: said numeric value range is defined by $\alpha < \Delta Tb < \beta$ where $\alpha < 0$ and $\beta > 0$ and satisfies $|\alpha| > |\beta|$, wherein $\Delta Tb$ is said battery temperature change rate.

8. An air flow control device for controlling an air flow of a cooling unit for supplying air to a battery to cool said battery, said air flow control device comprising:

a temperature change rate calculation unit configured to calculate a battery temperature change rate indicating an amount of change in a battery temperature of a battery over a predetermined time; and an air flow control unit configured to control an air flow of said cooling unit when said battery temperature is above a predetermined reference temperature, and said air flow control unit is further configured to perform a fan drive suppression process of said air flow of said cooling unit when said battery temperature change rate satisfies a predetermined suppression control condition regardless of whether or not said battery temperature is at or below said reference temperature and said air flow control unit is configured to stop said fan drive suppression process and switch to a previous mode when a predetermined suppression period $L_b$ has elapsed after said fan drive suppression process is started.

9. A computer readable medium storing a program causing a computer to execute a process for controlling an air flow of a cooling unit for supplying air to a battery to cool said battery so that a battery temperature of said battery is at or below a predetermined reference temperature, said process comprising:

calculating a battery temperature change rate indicating an amount of change in battery temperature of said battery over a predetermined time; and suppressing the air flow of said cooling unit, when said battery temperature change rate satisfies a predetermined suppression control condition, regardless of whether or not the battery temperature is at or below said reference temperature.

* * * * *